April 14, 1942.  S. M. DEL CAMP  2,279,916
FASTENER MEMBER AND FASTENER INSTALLATION
Filed Nov. 24, 1939
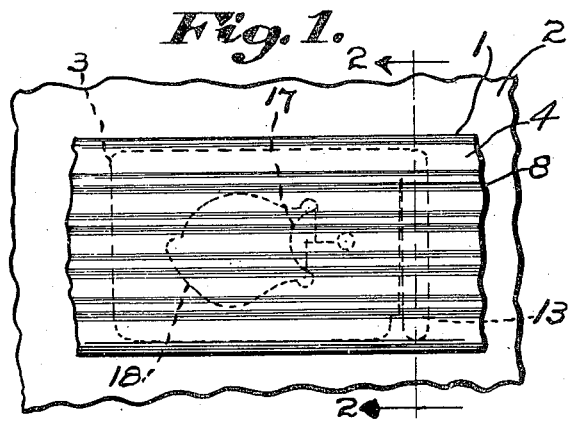
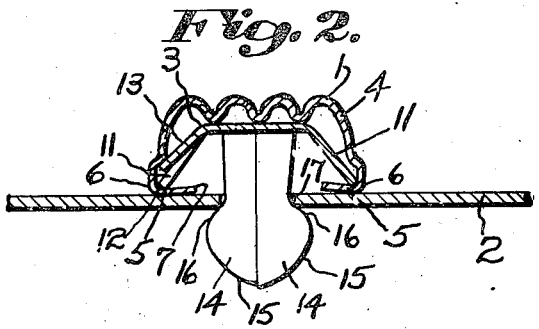
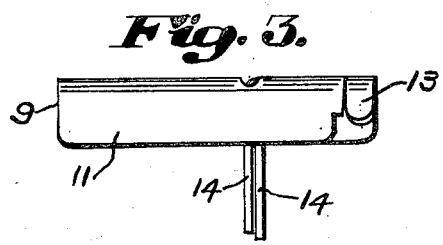
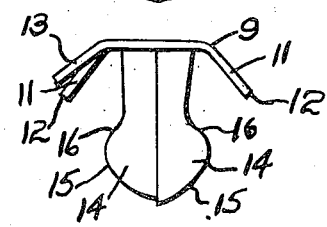
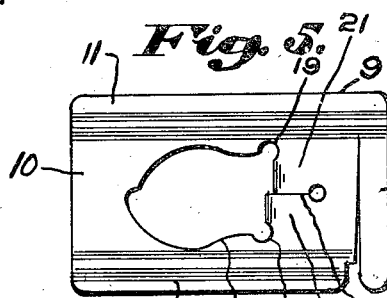
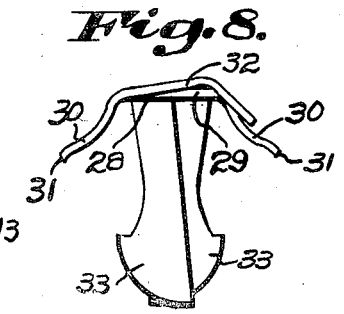
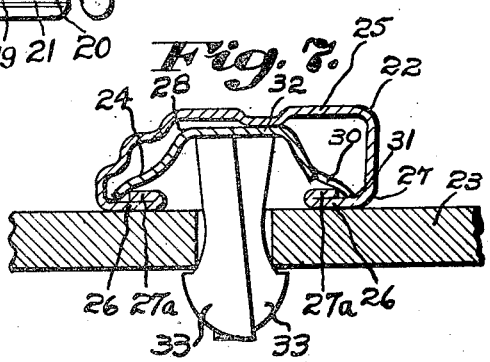
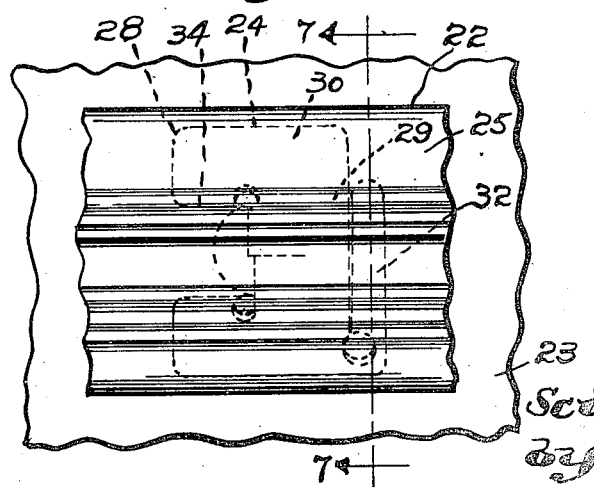
Inventor:
Scipione M. DelCamp.
by John Todd
Att'y.

Patented Apr. 14, 1942

2,279,916

UNITED STATES PATENT OFFICE 2,279,916

FASTENER MEMBER AND FASTENER INSTALLATION

Scipione M. Del Camp, Maywood, Ill., assignor to Cinch Manufacturing Corporation, Chicago, Ill., a corporation of Illinois Application November 24, 1939, Serial No. 305,968

4 Claims. (Cl. 24—73)

This invention relates to improvements in fastener secured installations and fasteners for the same.

The main object of my invention is an improved snap fastener member adapted to be assembled with a hollow member such as a molding strip or the like and providing means resiliently engaging the molding to limit movement between the parts.

Another object of my invention relates to a fastener of improved construction wherein it is formed of a minimum amount of material.

Other objects and uses of my invention will be apparent from inspection of the drawing and specification hereinbelow set forth.

Referring to the drawing, in which I have illustrated preferred embodiments of my invention:

Fig. 1 is a top plan view of a preferred installation comprising a molding strip secured to a supporting panel through means of my first form of fastener member;

Fig. 2 is a section taken along the line 2—2 of Fig. 1;

Fig. 3 is a side elevation of my first form of fastener member per se;

Fig. 4 is an end elevation of my first form of fastener member;

Fig. 5 is a top plan view of my first form of fastener member;

Fig. 6 is a top plan view of an installation showing a molding strip secured to a supporting panel by a modified form of fastener member;

Fig. 7 is a sectional view taken along the line 7—7 of Fig. 6; and

Fig. 8 is an end view of my modified form of fastener member per se.

Referring to the preferred installation of my invention illustrated in Fig. 1, I have shown an elongated hollow member, such as a molding strip 1 of the type commonly used on the exterior surfaces of automobiles and other apparatuses for ornamenting the same, secured to a supporting panel 2 by means of my first form of fastener member 3. The molding strip 1 is preferably of the type having a wall 4 which is of bowed or concave shape in transverse cross-section. Flange portions 5—5 extend inwardly from longitudinal ends 6 of the wall 4 and are spaced apart at their innermost ends defining an elongated opening 7. At least one end 8 of the molding strip 1 is open to permit entrance of the fastener member thereinto by relative longitudinal movement during assembly of the parts.

Referring in detail to my first form of fastener member illustrated in Figs. 1-5, I have shown one formed entirely of one piece of spring metal having a generally rectangular base portion 9. The base portion 9 preferably comprises a top portion 10 for engaging the inner surface of the upper portions of the molding and side portions 11—11 sloping downwardly from the top portion 10 on opposed sides thereof. The side portions 11—11 provide marginal free edges 12 adapted to engage the inner surface of the molding 1 near the junction of the flanges 5—5 with the wall 4. A spring finger portion 13 is integrally joined to the base 9 adjacent one end of the fastener and extends in transverse relation to the lines of the edges 12—12 of the side portions 11. The spring portion 13 normally projects out of and above the normal plane of the base 9 to engage the inner surface of the wall 4 of the molding strip when the parts are in final assembly to act as a brake for limiting relative movement of the parts, as hereinafter more fully described. The fastener member provides a pair of socket-engaging portions 14—14 which extend outwardly from the base 9 through the opening 7 of the molding strip when the parts are in assembly. The socket-engaging portions 14—14 are arranged in overlapping relation for scissors-like action and provide narrow edges 15—15 diverging from the outermost end of the socket-engaging portions and then converging as at 16—16 for snap fastener engagement with the supporting panel 2 through a circular opening 17 thereof. The socket-engaging portions 14 in my first form of invention are taken from material entirely within the marginal edges of the base 9 whereby an opening 18 is formed in the base. In order that the socket-engaging portions may have suitable resiliency, I have provided notches 19 (Fig. 5) in the base 9 on opposite sides of the socket-engaging portions adjacent their junction with the base. Also, I have formed a slit 20 extending from the opening 18 in parallel relation to the lines of the marginal edges of the side portions 11—11 for a predetermined distance toward the end of the base so as to form a pair of yieldable portions 21 capable of flexion when the socket-engaging portions 14—14 move in scissors-like action.

Assembly of the parts of my installation is easily carried out through first moving the base 9 of the fastener together with the spring finger 13 through the opening 8 of the molding strip with the socket-engaging portions 14—14 extending through the opening 7 of the strip. During this action the spring finger 13, which is of predetermined length relative to the corresponding dimension of the molding strip, will be contracted by engagement with the concave wall 4 of the strip to pass into the strip, after which it will tend to expand thereby resiliently engaging the inner surface of the wall 4. Thus the spring tension exerted on the wall 4 by the spring finger 13 acts as a brake or drag to restrict ready movement of the fastener base longitudinally of the molding strip. After the fasteners have been disposed in proper assembled position relative to the molding, the molding is moved to the supporting panel 2 and the socket-engaging portions 14—14 are snapped into assembly with the panel through the opening 17 thereof by a relative scissors-like action to dispose the converging portions 16—16 behind the supporting panel.

Referring in detail to my modified form of fastener member illustrated in Figs. 6, 7 and 8, I have shown an installation which is similar in form to the installation shown in Fig. 1 and which comprises a molding strip 22 secured to a supporting panel 23 through means of my second form of fastener member 24. The molding strip 22 is generally similar to the molding strip 1 of my first form of installation and comprises a wall 25 of concave cross-sectional shape and flanges 26 extending inwardly from longitudinal ends 27 of the wall 25. The flange portions 26 may have folded-back ends 27a forming an abutment tending to limit lateral movement of the fastener relative to the molding, as will be understood by those skilled in the art. My second form of fastener member 24 has a base 28 which preferably comprises a top portion 29 and side portions 30—30 sloping downwardly from the top portion 29 on opposite sides thereof. The side portions 30 provide marginal free edges 31 adapted to engage the molding 22, in my preferred installation, between the outer extremities of the folded-back ends 27a of the flange portions 26 and the junction of the flange portions with the wall 25, as shown in Fig. 7. A spring finger portion 32 integrally joined to the base 28 at one end thereof projects out of and above the plane of the top portion 29 in a transverse direction to the marginal edges 31 of the side portions 30—30, as most clearly shown in Fig. 8. My second form of fastener member provides socket-engaging portions 33 which are similar in form to the socket-engaging portions 14 of my first form of fastener and which have at least a portion thereof adjacent the base 28 formed from material of the base so as to leave an opening 34 (Fig. 6) extending inwardly from a marginal edge of the base to the junction of the support-engaging portions 14—14 with the base.

Assembly of my second form of fastener member with the molding strip 22 is carried out in a manner similar to that described in connection with my first form of fastener member. As a result of the slightly modified construction of my second form of fastener member, wherein the spring finger 32 projects above the highest point or top of the base 28 of the fastener, the spring finger effects resilient engagement with the inner surface of the higher portions of the wall 25 of the molding strip, as most clearly shown in Fig. 7, so as to resist relative longitudinal movement of the fastener and molding before the molding is affixed to the supporting panel.

Thus by my invention I have provided an improved fastener formed of a minimum amount of material and providing a braking means adapted to carry out efficiently the desired objects.

Although I have illustrated and described preferred embodiments of my invention, I do not wish to be limited thereby because the scope of my invention is best defined by the following claims.

I claim:

1. A spring sheet metal fastener having a base portion adapted to be disposed within a hollow member and shaped to engage the inner surfaces of said hollow member and a pair of flat yieldable socket-engaging portions integrally joined to said base and extending outwardly therefrom, said socket-engaging portions being taken entirely from material within the marginal edges of said base, and said base having an opening surrounded by a continuous imperforate wall from which said material was taken to form said socket-engaging portions.

2. A spring sheet-metal fastener having a base portion adapted to be disposed within an elongated hollow molding by a relative lengthwise sliding movement through an end of said molding prior to attachment of said fastener to a support, a spring finger portion integrally joined to said base, said finger normally projecting out of the plane of said base and having a smooth surface on one of its sides adapted to engage a portion of the walls of said molding under spring tension thereby to provide a drag against relative random movement of said parts but permitting easy purposeful movement, and socket-engaging means extending outwardly from said base.

3. A spring sheet metal fastener having a generally rectangular base portion adapted to be disposed within a hollow molding, said base having downwardly sloping side portions on opposed sides, said side portions providing marginal free edges to engage the inner surfaces of said molding, and a spring finger portion integrally joined to said base and extending in a direction substantially transverse to said lines of said marginal edges, said spring portion normally projecting out of the plane of said base and having a smooth surface on one of its sides adapted to engage a portion of the walls of said hollow molding under spring tension thereby to provide a drag against relative random movement of said parts but permitting purposeful movement, and socket-engaging portions extending outwardly from said base, at least portions of said socket-engaging portions being taken from material within the marginal edges of said base.

4. A spring sheet metal fastener having a generally rectangular base portion adapted to be disposed within a hollow member, said base having downwardly sloping side portions on opposed sides, said side portions providing marginal free edges to engage the inner surfaces of said hollow member, a spring finger portion integrally joined to said base at one end and extending in a direction substantially transverse to said lines of said marginal edges, socket-engaging portions extending outwardly from the lower surface of said base, and said spring portion normally projecting above the upper surface of said base and having a smooth surface on one of its sides adapted to engage a portion of the wall of said hollow member under spring tension thereby to provide a drag against relative random movement of said parts but permitting purposeful movement.

SCIPIONE M. DEL CAMP.